(12) United States Patent
Schedivy

(10) Patent No.: US 7,219,942 B2
(45) Date of Patent: May 22, 2007

(54) OVERHEAD SYSTEM ATTACHABLE TO A RAIL ASSEMBLY IN A VEHICLE AND METHOD FOR INSTALLING SAME

(75) Inventor: George C. Schedivy, Aquebogue, NY (US)

(73) Assignee: Audiovox Corporation, Hauppauge, NY (US)

( * ) Notice: Subject to any disclaimer, the term of this patent is extended or adjusted under 35 U.S.C. 154(b) by 32 days.

(21) Appl. No.: 10/982,943

(22) Filed: Nov. 5, 2004

(65) Prior Publication Data

US 2006/0097537 A1   May 11, 2006

(51) Int. Cl.
*B60R 11/02* (2006.01)

(52) U.S. Cl. ...................... 296/37.7; 296/214

(58) Field of Classification Search ............ 296/24.34, 296/37.7, 214
See application file for complete search history.

(56) References Cited

U.S. PATENT DOCUMENTS

| | | | |
|---|---|---|---|
| 3,451,035 A | 6/1969 | Baldwin ........................ 339/21 |
| 3,474,381 A | 10/1969 | Baldwin ........................ 339/21 |
| 4,182,532 A | 1/1980 | Walker, Sr. .................. 296/137 |
| 4,824,159 A | 4/1989 | Fluharty et al. | |
| 5,040,990 A | 8/1991 | Suman et al. | |
| D320,587 S | 10/1991 | Kapp et al. | |
| 5,180,089 A | 1/1993 | Suman et al. ............. 224/42.45 |
| D339,780 S | 9/1993 | Burdick | |
| D340,016 S | 10/1993 | Falcoff | |
| D340,017 S | 10/1993 | Falcoff | |
| D340,215 S | 10/1993 | Falcoff | |
| 5,469,298 A | 11/1995 | Suman et al. | |
| 5,599,086 A | 2/1997 | Dutta ........................... 362/74 |
| 5,650,929 A | 7/1997 | Potter et al. .......... 364/423.098 |
| 5,713,623 A * | 2/1998 | Mattingly ................... 296/37.7 |
| D391,926 S | 3/1998 | Brunner et al. | |
| D394,432 S | 5/1998 | Rosen | |
| 5,775,762 A | 7/1998 | Vitito | |
| D399,200 S | 10/1998 | Rosen | |
| D399,503 S | 10/1998 | Rosen | |
| 5,822,023 A | 10/1998 | Suman et al. | |
| 5,927,784 A | 7/1999 | Vitito | |
| 5,940,120 A | 8/1999 | Frankhouse et al. | |
| 5,946,055 A | 8/1999 | Rosen | |
| D413,856 S | 9/1999 | Scribner | |
| 6,059,255 A | 5/2000 | Rosen et al. | |
| D430,545 S | 9/2000 | Rosen | |
| 6,125,030 A | 9/2000 | Mola et al. | |
| 6,186,459 B1 | 2/2001 | Ma | |
| 6,203,088 B1 | 3/2001 | Fernandez et al. ......... 296/37.8 |
| 6,304,173 B2 | 10/2001 | Pala et al. .................. 340/461 |
| D451,895 S | 12/2001 | Lavelle et al. | |
| 6,338,517 B1 | 1/2002 | Canni et al. ............... 296/37.8 |
| D453,325 S | 2/2002 | Okada et al. | |
| D454,121 S | 3/2002 | Lavelle et al. | |

(Continued)

Primary Examiner—Jason Morrow
(74) Attorney, Agent, or Firm—F. Chau & Associates, LLC

(57) ABSTRACT

An overhead system for use in a vehicle, comprises a bracket mounted on at least two rails of a vehicle rail assembly, wherein the at least two rails are positioned on a headliner of the vehicle, and a console mounted to the bracket, wherein the console includes a front-side portion, a back-side portion, a left-side portion and a right-side portion, and a plurality of notches are positioned on the front-side and back-side portions for fitting around the at least two rails.

36 Claims, 10 Drawing Sheets

U.S. PATENT DOCUMENTS

| | | |
|---|---|---|
| D455,130 S | 4/2002 | Skaff et al. |
| D462,670 S | 9/2002 | Kasuga et al. |
| D467,562 S | 12/2002 | Chang |
| D468,711 S | 1/2003 | Chang |
| 6,575,528 B2 | 6/2003 | Tiesler et al. ............... 296/214 |
| 6,608,399 B2 | 8/2003 | McConnell et al. ....... 307/10.1 |
| 6,669,260 B2 | 12/2003 | Clark et al. |
| D489,044 S | 4/2004 | Bremenkamp et al. |
| 6,957,839 B1* | 10/2005 | Tiesler et al. ............ 296/24.34 |
| 6,971,699 B2* | 12/2005 | Isaacson .................... 296/37.7 |
| 2001/0005083 A1 | 6/2001 | Serizawa et al. |
| 2002/0113451 A1 | 8/2002 | Chang |
| 2002/0140289 A1 | 10/2002 | McConnell et al. ....... 307/10.1 |
| 2002/0163219 A1 | 11/2002 | Clark et al. |
| 2003/0075955 A1 | 4/2003 | Tiesler et al. |
| 2003/0127878 A1 | 7/2003 | Gort et al. .................. 296/37.8 |
| 2003/0168875 A1* | 9/2003 | Anderson et al. .......... 296/37.8 |
| 2004/0061358 A1 | 4/2004 | Vishey et al. |
| 2004/0160087 A1* | 8/2004 | Tiesler ...................... 296/37.7 |
| 2005/0082862 A1* | 4/2005 | Anderson et al. .......... 296/37.7 |
| 2005/0134067 A1* | 6/2005 | Brettfeld et al. ......... 296/24.34 |
| 2005/0258663 A1* | 11/2005 | Huisingh et al. .......... 296/37.7 |
| 2006/0237984 A1* | 10/2006 | Stone et al. ............... 296/37.7 |

* cited by examiner

OVERHEAD SYSTEM ATTACHABLE TO A RAIL ASSEMBLY IN A VEHICLE AND METHOD FOR INSTALLING SAME

BACKGROUND OF THE INVENTION

1. Technical Field

The present disclosure relates to an overhead system, and more particularly to an overhead console and entertainment system capable of being mounted to a rail assembly in a vehicle and a method for installing same.

2. Discussion of the Related Art

Entertainment consoles mounted in vehicles provide video and audio entertainment to passengers therein. Some known designs of consoles include a screen for displaying video and a media source, such as a video cassette player (VCP) or a digital video disc (DVD) player. In some instances, the known consoles are positioned overhead in a vehicle and are directly attached to a vehicle headliner.

SUMMARY OF THE INVENTION

An overhead system for use in a vehicle, in accordance with an embodiment of the present invention, comprises a bracket mounted on at least two rails of a vehicle rail assembly, wherein the at least two rails are positioned on a headliner of the vehicle, and a console mounted to the bracket, wherein the console includes a front-side portion, a back-side portion, a left-side portion and a right-side portion, and a plurality of notches are positioned on the front-side and back-side portions for fitting around the at least two rails.

The at least two rails may be aligned parallel with each other and a majority of the bracket may be positioned between the at least two rails. The bracket may include a first portion for fitting in a space between a first rail of the at least two rails and the headliner and a second portion for fitting in a space between a second rail of the at least two rails and the headliner. The bracket may include a stepped configuration for varying the height of the bracket.

A height of one or more of the left-side, right-side, front-side and back-side portions may be varied according to a contour of the headliner. At least one notch of the plurality of notches may have a greater depth than the remaining notches of the plurality of notches.

The overhead system may further comprise a console bracket attached to the console, wherein the console is mounted to the bracket using the console bracket. The console bracket may be coupled to the bracket using a plurality of fasteners or an adhesive. The console bracket may include a plurality of holes aligning with a plurality holes in the bracket to receive the plurality of fasteners. The console bracket may be attached to the console using at least one fastener or an adhesive. The console bracket may also be molded to the console.

The console may include an open section in the center of the console and the console bracket may be positioned in the open section. The console bracket may be T-shaped and may be recessed from at least one of a top and bottom surface of the console.

An entertainment system may be mounted to the console via the console bracket. The entertainment system may be fixed to the console bracket using at least one fastener. The entertainment system may include at least one hole aligned with a hole in the console bracket for receiving the at least one fastener. A border may be positioned between the entertainment system and the front, back, left and right-side portions of the console. The entertainment system may include a screen for displaying a video program.

A bracket for mounting an article to a vehicle rail assembly, in accordance with an embodiment of the present invention, comprises a first portion for fitting in a space between a first rail of the rail assembly and a vehicle headliner, and a second portion for fitting in a space between a second rail of the rail assembly and the vehicle headliner, wherein the first and second rails are positioned on the vehicle headliner and are aligned parallel with each other, and a majority of the bracket is positioned between the first and second rails.

The article may be a console including a plurality of notches for fitting around the first and second rails and may be coupled to the bracket using at least one fastener. The bracket may include at least one hole aligning with a hole in the article to receive the at least one fastener.

A method for installing an overhead system in a vehicle, in accordance with an embodiment of the present invention, comprises mounting a bracket on at least two rails of a vehicle rail assembly, wherein the at least two rails are positioned on a headliner of the vehicle, mounting a console to the bracket, wherein the console includes a front-side portion, a back-side portion, a left-side portion and a right-side portion, and a plurality of notches are positioned on the front-side and back-side portions for fitting around the at least two rails.

Mounting the bracket may comprise fitting a first portion of the bracket in a space between a first rail of the at least two rails and the headliner, and fitting a second portion of the bracket in a space between a second rail of the at least two rails and the headliner.

The method may further comprise fixing a console bracket to the console for coupling the console to the bracket. Coupling the console to the bracket may comprise aligning a plurality of holes in the console bracket with a plurality holes in the bracket, and positioning a fastener through each set of aligned holes.

The method may further comprise mounting an entertainment system to the console, wherein mounting the entertainment system comprises aligning at least one hole in the entertainment system with a hole in the console bracket, and positioning at least one fastener through the aligned holes.

BRIEF DESCRIPTION OF THE DRAWINGS

Preferred embodiments of the invention can be understood in more detail from the following descriptions taken in conjunction with the accompanying drawings in which.

DETAILED DESCRIPTION OF THE PREFERRED EMBODIMENTS

Preferred embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

Referring to FIGS. 1–4, an overhead console 10 is shown. The overhead console 10 includes an open center section 12. A recessed lip portion 14 is positioned around the inside perimeter of the console 10. The console 10 includes four notches 16 aligned with each other on left and right sides of the console 10. The notches 16 are designed to fit around a rail assembly including two parallel rails, positioned on a headliner of a vehicle.

Figure 1:
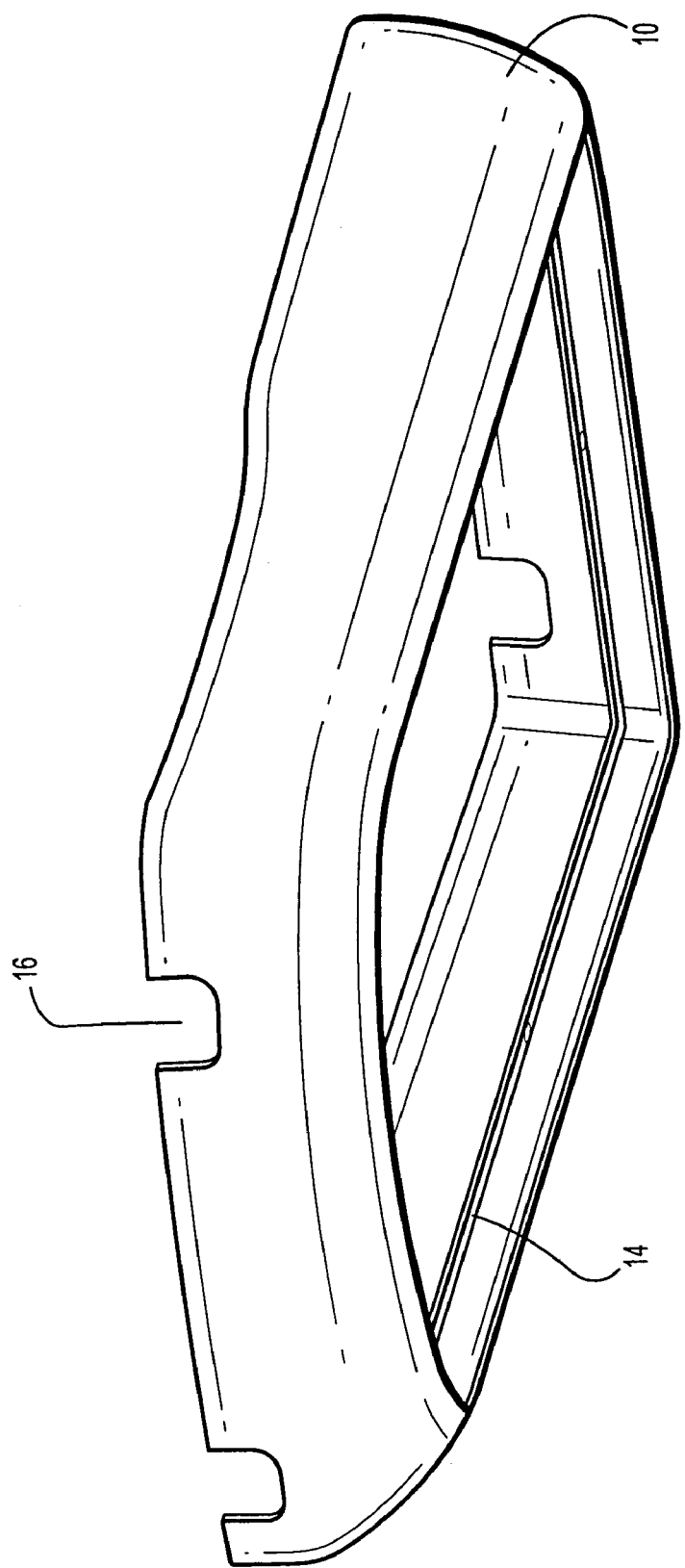
FIG. 1 is a perspective view of an overhead console, in accordance with an embodiment of the present invention.
Figure 2:
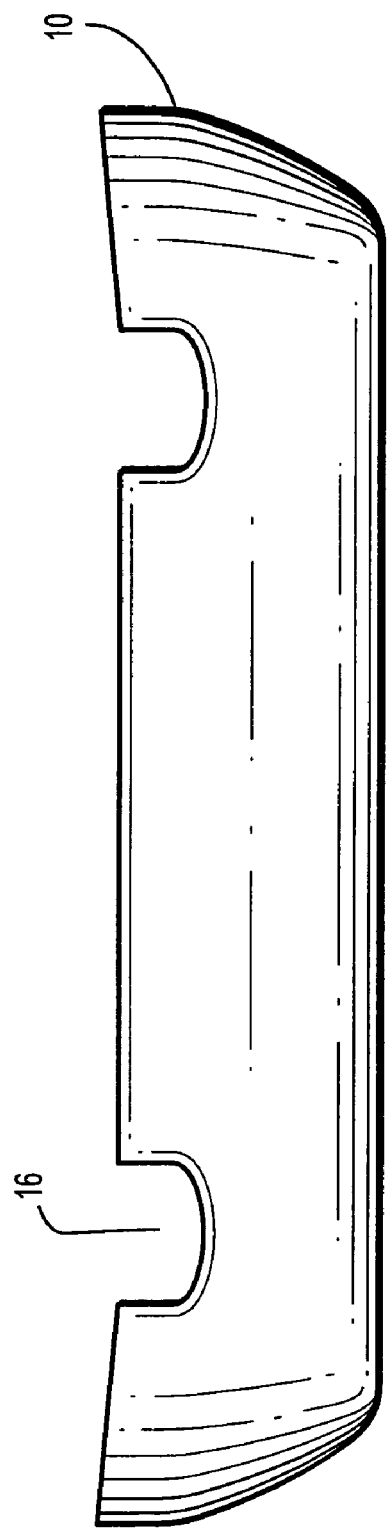
FIG. 2 is a front view of an overhead console, in accordance with an embodiment of the present invention.
Figure 3:
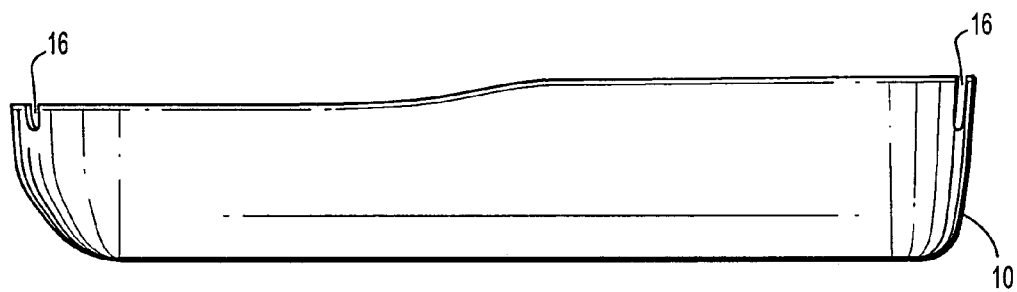
FIG. 3 is a left-side view of an overhead console, in accordance with an embodiment of the present invention.
Figure 4:
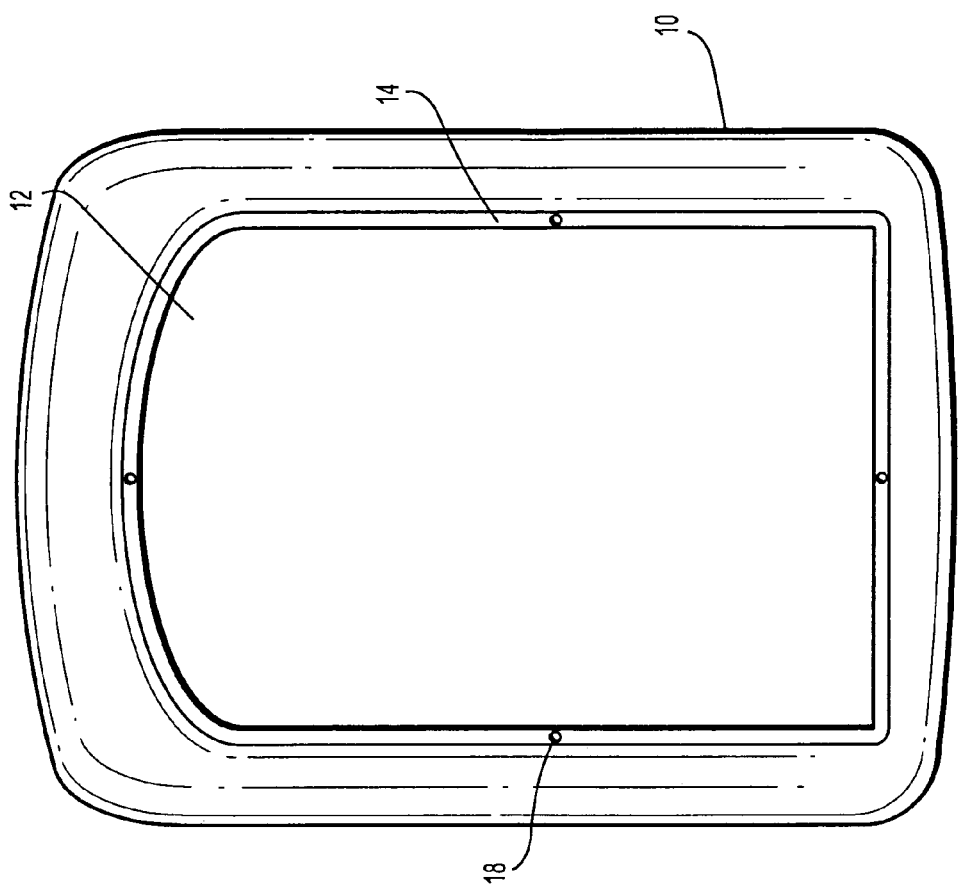
FIG. 4 is a bottom view of an overhead console, in accordance with an embodiment of the present invention.

As shown in FIGS. 1 and 3, the console 10 is contoured to have different heights on its right and left sides to fit snugly against a vehicle headliner having different thicknesses. As shown in FIG. 3, the notches 16 are cut to different depths to allow the console 10 to sit flush against a contoured headliner. Depending on the design of the headliner and location of the console, one or more notches may be cut to different depths and the height of any of the front, back, left and right sides may be varied to ensure a snug fit of the console against the headliner.

Alternatively, the notches 16 are all cut to the same depth and the console 10 has the same height along each side to fit snugly to a headliner having a uniform thickness. The material of the console 10 may include plastic, rubber or the like.

Figure 5:
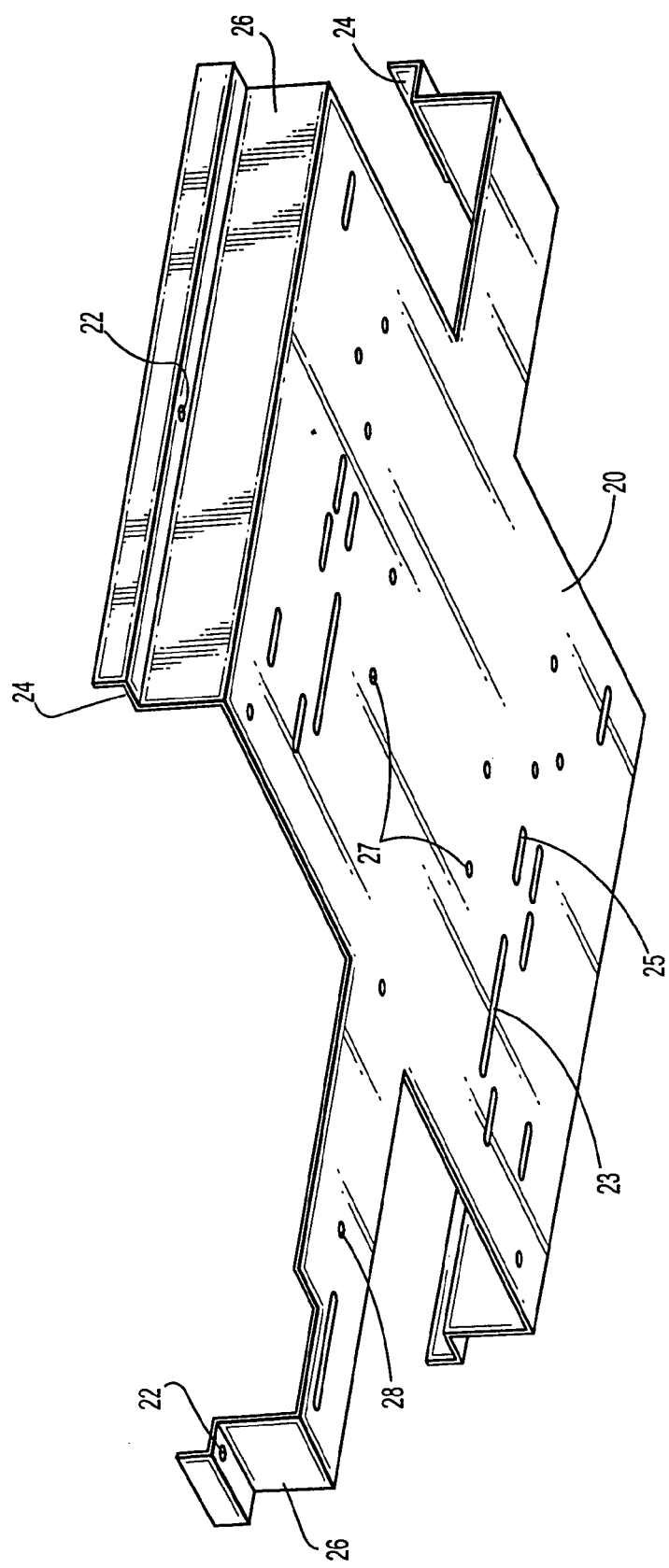
FIG. 5 is a perspective view of a console bracket, in accordance with an embodiment of the present invention.
Figure 6:
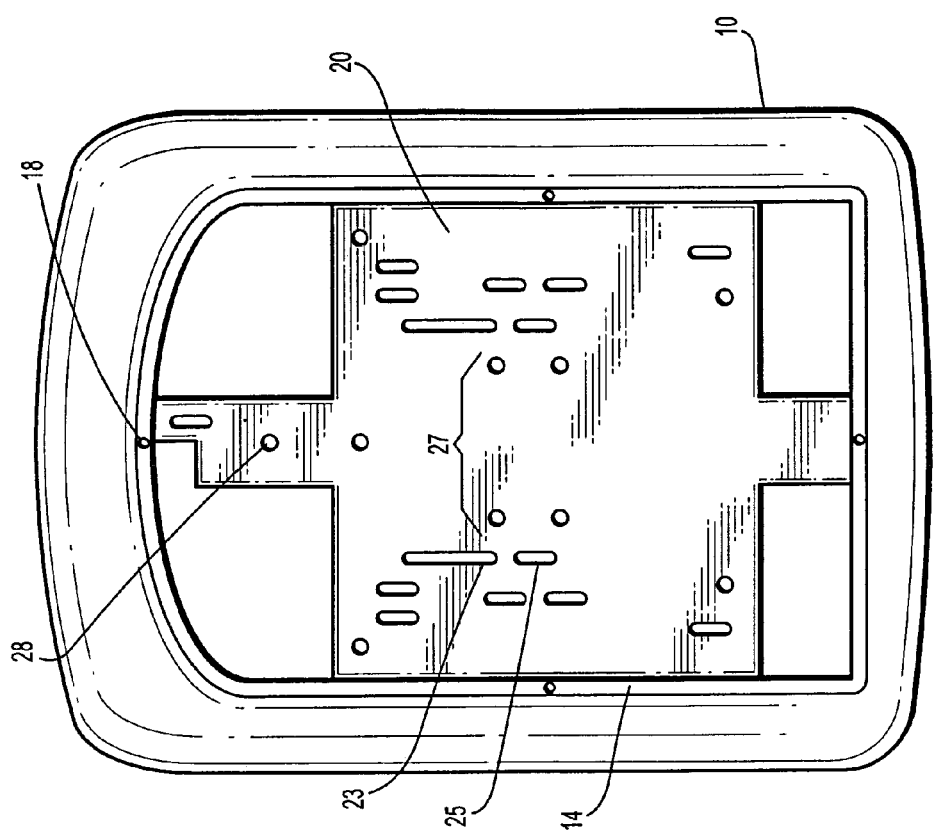
FIG. 6 is a bottom view of a console bracket coupled to an overhead console, in accordance with an embodiment of the present invention.

Referring to FIGS. 5 and 6, a T-shaped console bracket 20 is shown. The console bracket 20 is sized to fit in the center section 12 of the console 10. The console bracket 20 includes holes 22, which align with holes 18 positioned on the lip portion 14 of the console 10. The holes 18 and 22 receive fasteners, such as screws, bolts, rivets or the like, for fixing the console bracket 20 to the console 10. In an alternative embodiment, the console bracket 20 may be fixed to the console 10 by using an adhesive, such as glue or cement.

As shown in FIG. 5, the console bracket 20 includes extension portions 26 for further recessing the console bracket 20 from the bottom of the console 10. The overall height of the console bracket 20 is such that it is also recessed from the top of the console 10.

The L-shaped portions 24 on each extension portion 26 fit into grooves (not shown) between the lip portion 14 and the body of the console 10 for providing a tight fit of the console bracket 20 to the console 10.

The console bracket 20 is made of the same material as the console 10, including plastic, rubber or the like. Alternatively, the console bracket 20 may be made of metal, such as aluminum, steel, metal alloys or the like. In another embodiment, the console bracket 20 can be molded to the console 10 so that the console and console bracket 10, 20 are formed as one piece.

Figure 7:
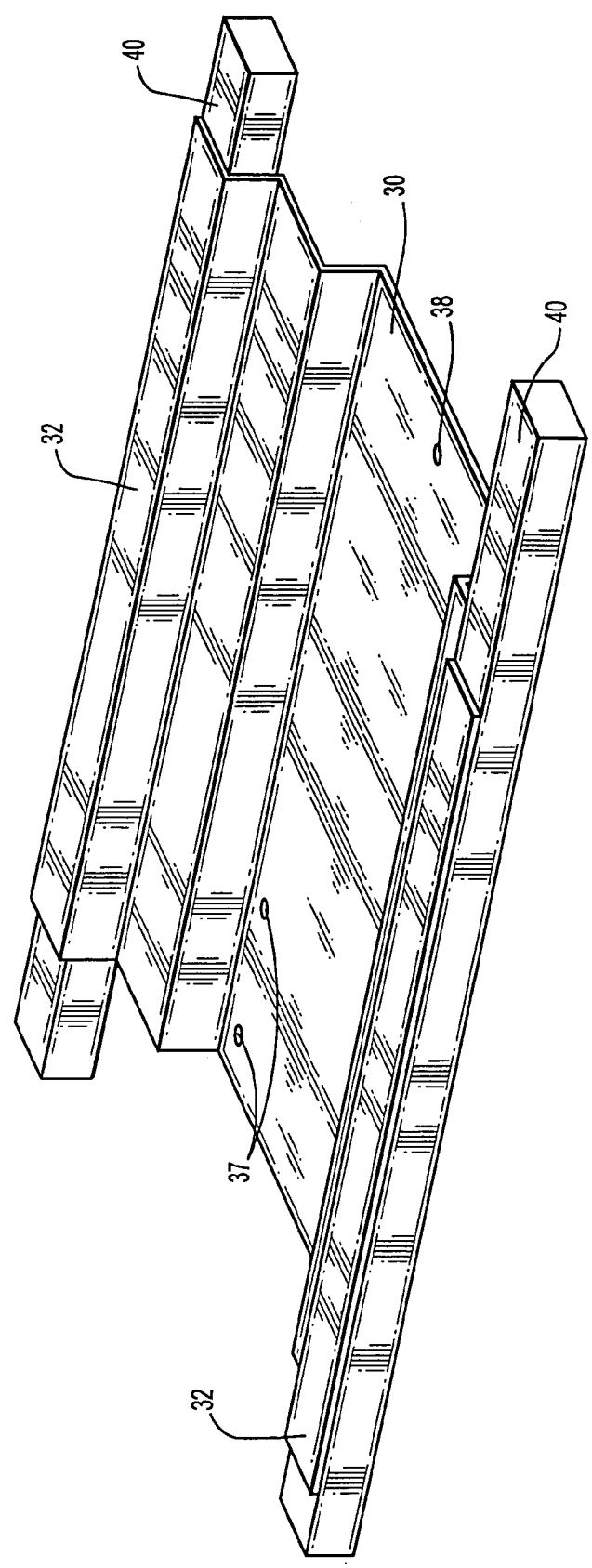
FIG. 7 is a perspective view of a main bracket positioned on a rail assembly of a vehicle, in accordance with an embodiment of the present invention.
Figure 9:
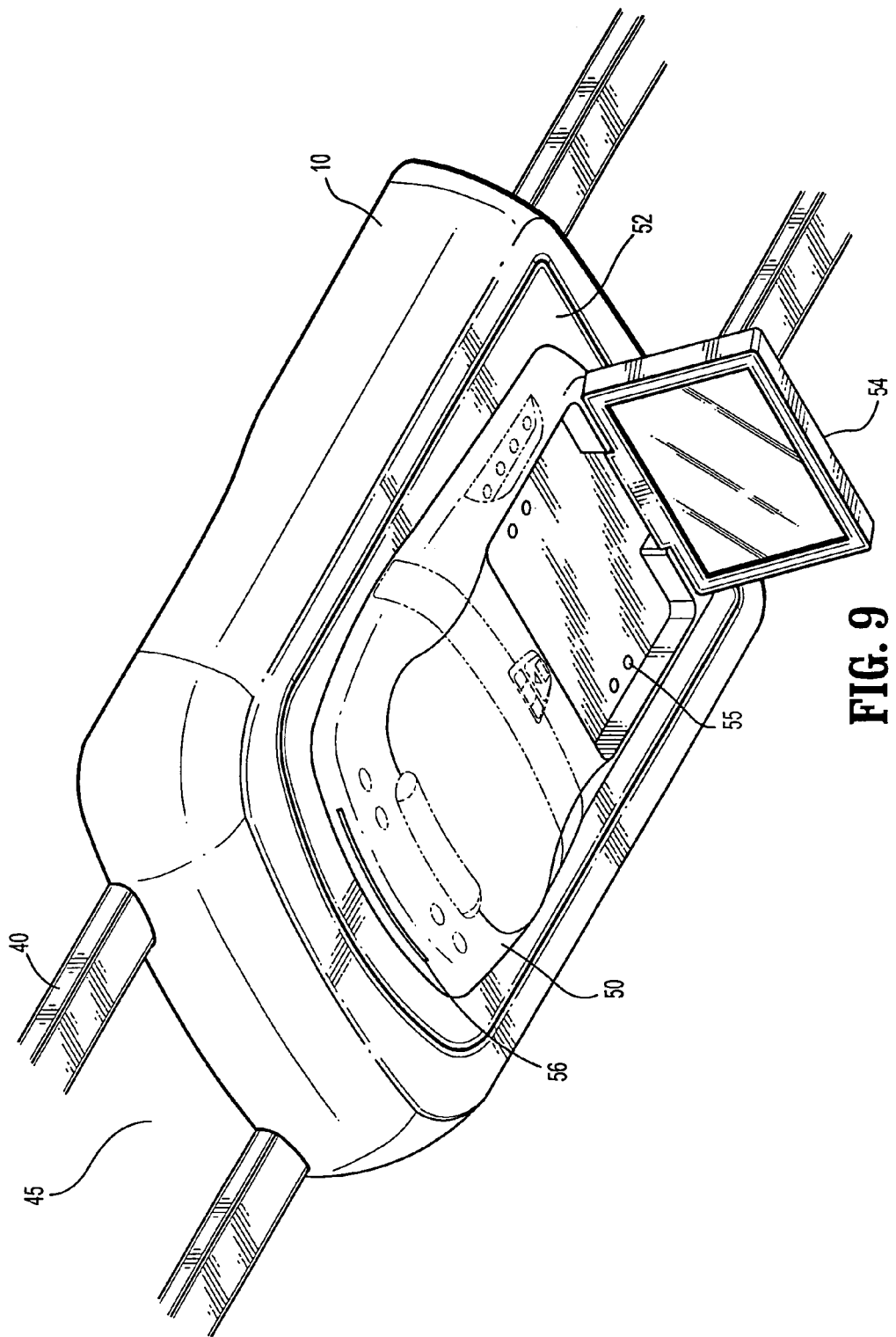
FIGS. 9 and 10 are perspective views of an overhead console including an entertainment system coupled to a rail assembly of a vehicle, in accordance with an embodiment of the present invention.
Figure 10:
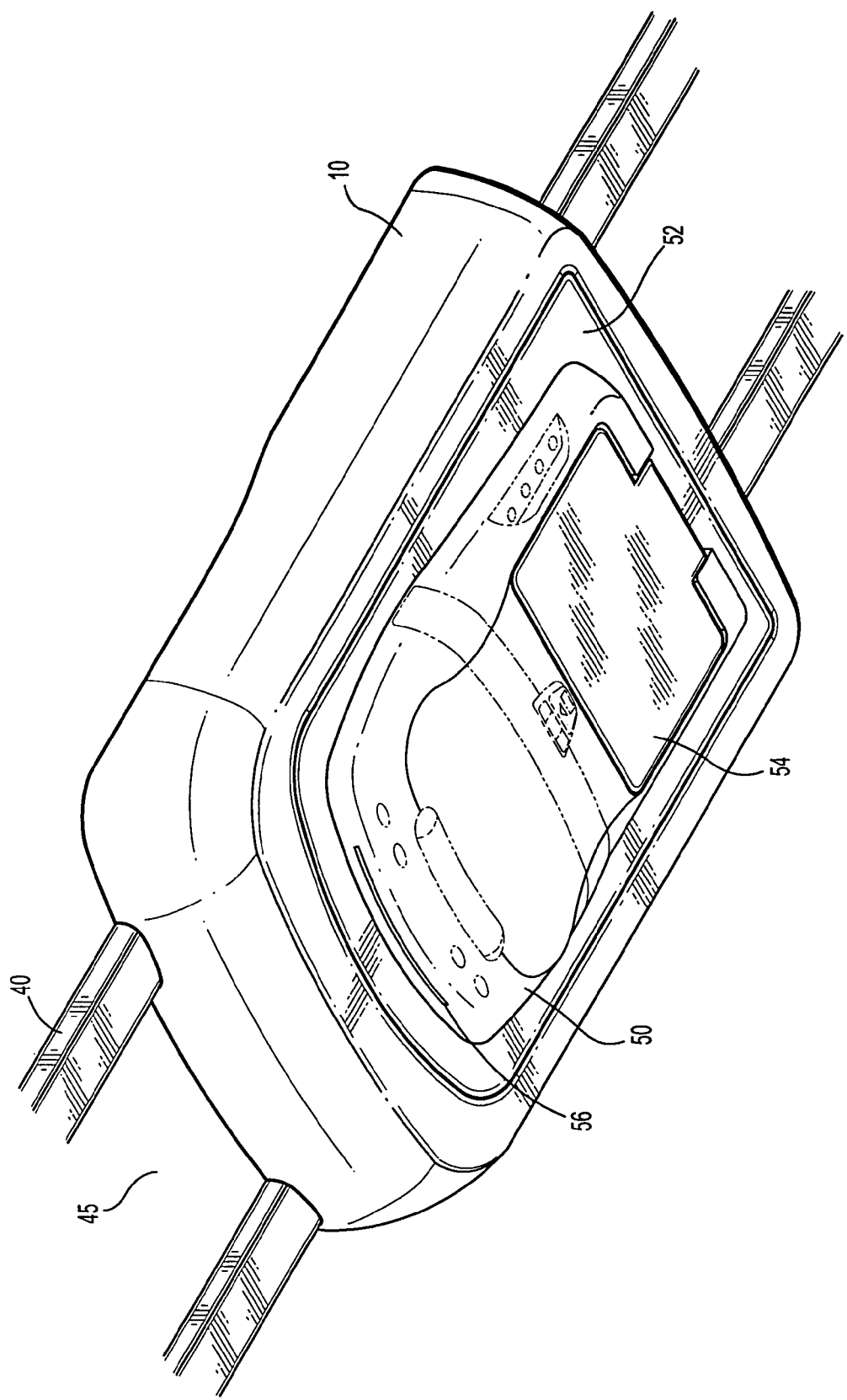

Referring to FIG. 7, a main bracket 30 is shown. The main bracket 30 is sized to fit between two rails 40 of a vehicle rail assembly. In order to illustrate installation of the main bracket 30, FIG. 7 shows the rails as if the vehicle headliner were removed. As shown in FIGS. 9 and 10, the rails 40 are mounted to be positioned against the headliner 45 of the vehicle.

The rails 40 are mounted on the vehicle headliner 45 using means known to one of ordinary skill in the art, such as brackets, screws, glue or the like. The rails 40 may be installed in the vehicle as part of a factory overhead rail assembly.

Mounting of the rails 40 on the headliner 45 is such that a small space is formed between the top of each rail 40 and the headliner 45. The main bracket 30 is mounted to the rails 40 by inserting side flap portions 32 of the main bracket 30 into the space formed between each rail 40 and the headliner 45, such that the flap portions 32 rest on the top of each rail 40. The thickness of the flap portions 32 is such that the flap portions 32 fit snugly in the spaces to secure the main bracket 30.

Installation of the main bracket 30 is performed by inserting either the left or right flap portion 32 into the space between a first rail 40 and the headliner 45 and shifting the position of the main bracket 30 enough to allow the opposite flap portion 32 to be inserted into the space between the second rail 40 and the headliner 45. The width of the main bracket 30 is sufficient to create a snug fit of the main bracket 30 between the rails 40 so as to prevent dislodging or rattling of the console and entertainment system when the vehicle is in motion. For example, the main bracket 30 may be designed to have a width between the ends of each flap portion 32 of approximately 10.5 inches to fit between rails that are approximately 1.5 inches wide and spaced apart by approximately 7.5 inches. It is to be understood that the dimensions of the main bracket and the rail assembly are not limited to the foregoing and may be varied based on such factors as available space in the vehicle, vehicle manufacturer (for factory installed rail assemblies) and size of the entertainment system.

As shown in FIG. 7, the main bracket 30 includes a stepped configuration to vary the height of the main bracket 30 such that a central portion of the main bracket 30 hangs lower than side portions thereof. The main bracket 30 is preferably made from metal, such as steel, but may be made from other materials, such as aluminum, metal alloys, and/or plastic.

Once the main bracket 30 has been mounted to the rails 40, the console 10 including the console bracket 20 is attached to the main bracket 30. The console 10 is attached to the main bracket 30 using a plurality of fasteners, such as screws, bolts, rivets, clips or the like. For example, a plurality of screws are driven through holes 27 of the console bracket 20 into holes 37 of the main bracket 30 and through hole 28 of the console bracket 20 into hole 38 of the main bracket 30. It is to be understood that the positioning and number of fasteners is not limited to the foregoing and may be varied by one of ordinary skill in the art. In an alternative embodiment, the console bracket 20 may be attached to the main bracket 30 using an adhesive, such as glue or cement.

Figure 8:
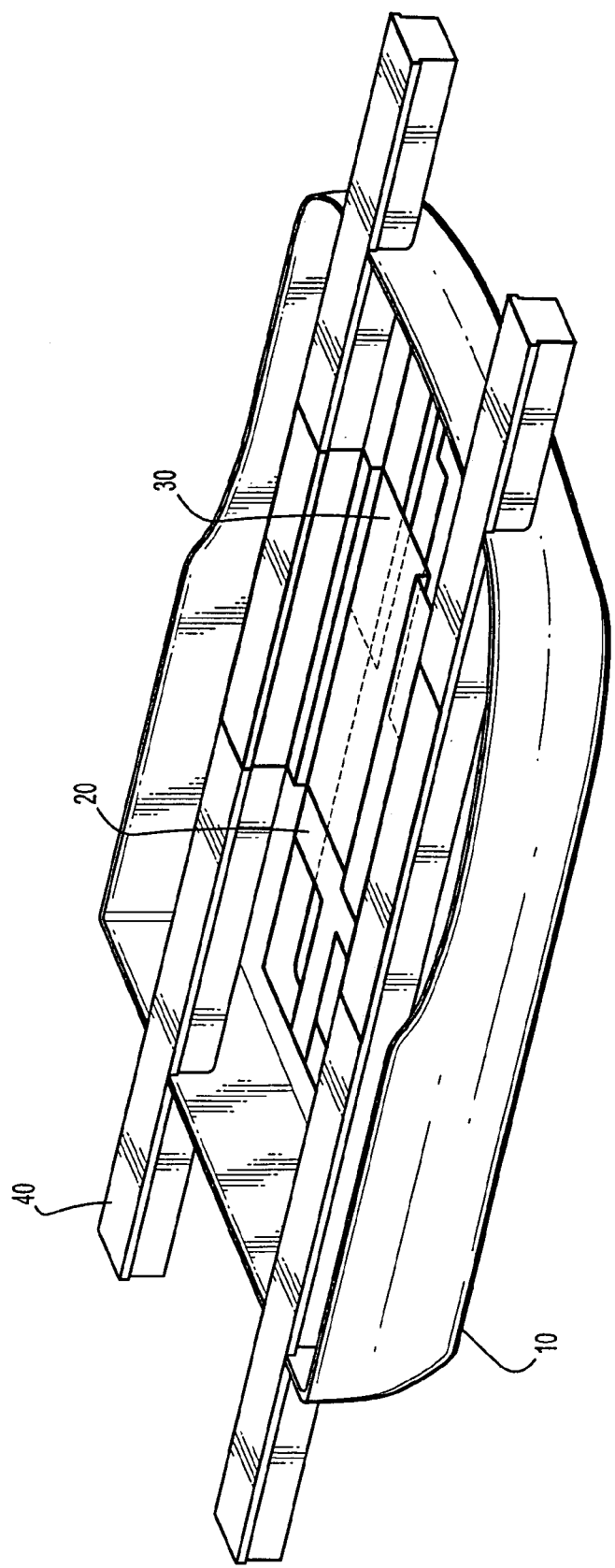
FIG. 8 is a perspective view of an overhead console coupled to the main bracket of FIG. 7, in accordance with an embodiment of the present invention.

FIG. 8 shows the main bracket positioned on the rails 40 and the console 10 coupled to the main bracket 30 via the console bracket 20. The console and main bracket combination may require minor shifting or sliding along the length of the vehicle to ensure proper positioning of the console and, if the vehicle has a contoured headliner, alignment of the contours of the console with the contours of the headliner.

Once the combination has been properly located, a hole is cut in the headliner 45 that is sized to allow passage of wiring and connectors, but also to be hidden by the console 10. The wiring and connectors run to and from the entertainment system 50 and may include video, audio and power cables connected via a wire harness to the vehicle radio and/or other entertainment systems in the vehicle. As can be seen from FIG. 8, the configuration of the console bracket 20 and the positioning of the console bracket 20 with respect to main bracket 30 leaves a number of openings through which wires may fed to and from the entertainment system 50.

Referring to FIGS. 9 and 10, the entertainment system 50 is positioned in the center section 12 of the console 10. Depending on the size and shape of the entertainment system 50, the entertainment system 50 may be installed with a border 52 to ensure a tight fit in the console 10. After making the requisite electrical connections, the entertainment system 50 is coupled to the console 10 by fastening the entertainment system 50 to the console bracket 20. As shown in FIG. 9, in order to fix the entertainment system 50 to the console bracket 20, fasteners, such as screws, bolts, rivets, clips or the like, are passed through holes 55 into holes 23 and 25 of the console bracket 20. As shown in FIGS. 5 and 6, the console bracket 20 includes a plurality of holes at different positions and having different sizes to accommodate entertainment systems having different designs and configurations. It is to be understood that the number and positioning of the fasteners for mounting the entertainment system 50 is not limited to the foregoing and may be varied by one of ordinary skill in the art.

The entertainment system 50 may have the capability of displaying a video program. As shown in FIGS. 9 and 10, the entertainment system 50 includes a screen 54, which can be adjusted between open and stowed positions. As shown in FIG. 9, the screen 54 is open so that the screws may be placed in the holes 55. The entertainment system 50 also receives media storage mediums, such as digital video discs (DVDs), through a slot 56 for playing on a media player, such as a DVD player, built into the entertainment system 50.

An entertainment system may include any one or combination of a DVD player, a CD-ROM player, a video game player, a videocassette player (VCP), a television or radio tuner, a wireless receiver for playing media received via wireless techniques such as 802.11, Bluetooth®, cellular transmission, including Code Division Multiple Access (CDMA) or other technology using spread-spectrum techniques, and satellite transmission, an MP3 player, or a digital video recorder (DVR) or similar device capable of downloading, recording, storing (e.g., on a storage device, such as a hard disk) and/or playing video and/or audio files or programs.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. An overhead system for use in a vehicle, comprising:
    a bracket mounted on at least two rails of a vehicle rail assembly, wherein the at least two rails are positioned on a headliner of the vehicle;
    a console mounted to the bracket, wherein:
        the console includes a front-side portion, a back-side portion, a left-side portion and a right-side portion; and
        a plurality of notches are positioned on the front-side and back-side portions for fitting around the at least two rails; and
    a console bracket attached to the console, wherein the console is mounted to the bracket using the console bracket.

2. The overhead system as recited in claim 1, wherein the at east two rails are aligned parallel with each other and a majority of the bracket is positioned between the at least two rails.

3. The overhead system as recited in claim 1, wherein the bracket includes a first portion for fitting in a space between a first rail of the at least two rails and the headliner and a second portion for fitting in a space between a second rail of the at least two rails and the headliner.

4. The overhead system as recited in claim 1, wherein the bracket includes a stepped configuration for varying the height of the bracket.

5. The overhead system as recited in claim 1, wherein a height of one or more of the left-side, right-side, front-side and back-side portions is varied according to a contour of the headliner.

6. The overhead system as recited in claim 1, wherein at least one notch of the plurality of notches has a greater depth than another notch of the plurality of notches.

7. The overhead system as recited in claim 1, wherein the console bracket is coupled to the bracket using a plurality of fasteners.

8. The overhead system as recited in claim 7, wherein the console bracket includes a plurality of holes aligning with a plurality holes in the bracket to receive the plurality of fasteners.

9. The overhead system as recited in claim 1, wherein the console bracket is attached to the console using at least one fastener.

10. The overhead system as recited in claim 1, wherein the console bracket is molded to the console.

11. The overhead system as recited in claim 1, wherein the console bracket is attached to the console using an adhesive.

12. The overhead system as recited in claim 1, wherein the console bracket is coupled to the bracket using an adhesive.

13. The overhead system as recited in claim 1, wherein the console includes an open section in the center of the console and the console bracket is positioned in the open section.

14. The overhead system as recited in claim 13, wherein the console bracket is recessed from at least one of a top and bottom surface of the console.

15. The overhead system as recited in claim 13, wherein the console bracket is T-shaped.

16. The overhead system as recited in claim 1, further comprising an entertainment system mounted to the console.

17. The overhead system as recited in claim 1, further comprising an entertainment system mounted to the console via the console bracket.

18. The overhead system as recited in claim 17, wherein the entertainment system is fixed to the console bracket using at least one fastener.

19. The overhead system as recited in claim 18, wherein the entertainment system includes at least one hole aligned with a hole in the console bracket for receiving the at least one fastener.

20. The overhead system as recited in claim 17, wherein a border is positioned between the entertainment system and the front, back, left and right-side portions of the console.

21. The overhead system as recited in claim 17, wherein the entertainment system includes a screen for displaying a video program.

22. An overhead system for use in a vehicle, comprising:
a bracket for mounting an article to a vehicle rail assembly, the bracket comprising:
a first portion for fitting in a space between a first rail of the rail assembly and a vehicle headliner;
a second portion for fitting in a space between a second rail of the rail assembly and the vehicle headliner; and
a stepped configuration for varying the height of the bracket, wherein:
the first and second rails are positioned on the vehicle headliner and are aligned parallel with each other; and
a majority of the bracket is positioned between the first and second rails.

23. The overhead system as recited in claim 22, wherein the article is a console including a plurality of notches for fitting around the first and second rails.

24. The overhead system as recited in claim 22, wherein the article is coupled to the bracket using at least one fastener.

25. The overhead system as recited in claim 24, wherein the bracket includes at least one hole aligning with a hole in the article to receive the at least one fastener.

26. A method for installing an overhead system n a vehicle, comprising:
mounting a bracket on at least two rails of a vehicle rail assembly, wherein the at least two rails are positioned on a headliner of the vehicle, and bracket includes a stepped configuration for varying the height of the bracket; and
mounting a console to the bracket, wherein:
the console includes a front-side portion, a back-side portion, a left-side portion and a right-side portion; and
a plurality of notches are positioned on the front-side and back-side portions for fitting around the at least two rails.

27. The method as recited in claim 26, wherein the at least two rails are aligned parallel with each other and a majority of the bracket is positioned between the at least two rails.

28. The method as recited in claim 26, wherein mounting the bracket comprises:
fitting a first portion of the bracket in a space between a first rail of the at least two rails and the headliner; and
fitting a second portion of the bracket in a space between a second rail of the at least two rails and the headliner.

29. The method as recited in claim 26, wherein a height of one or more of the left-side, right-side, front-side and back-side portions is varied according to a contour of the headliner.

30. The method as recited in claim 26, wherein at least one notch of the plurality of notches has a greater depth than another notch of the plurality of notches.

31. The method as recited in claim 26, further comprising fixing a console bracket to the console for coupling the console to the bracket.

32. The method as recited in claim 31, wherein coupling the console to the bracket comprises:
aligning a plurality of holes in the console bracket with a plurality holes in the bracket; and
positioning a fastener through each set of aligned holes.

33. The method as recited in claim 31, further comprising mounting an entertainment system to the console.

34. The method as recited in claim 33, wherein mounting the entertainment system comprises:
aligning at least one hole in the entertainment system with a hole in the console bracket; and
positioning at least one fastener through the aligned holes.

35. An overhead system for use in a vehicle, comprising:
a bracket for mounting an article to a vehicle rail assembly, the bracket comprising:
a first portion for fitting in a space between a first rail of the rail assembly and a vehicle headliner; and
a second portion for fitting in a space between a second rail of the rail assembly and the vehicle headliner, wherein:
the first and second rails are positioned on the vehicle headliner and are aligned parallel with each other;
a majority of the bracket is positioned between the first end second rails; and
the article is a console including a plurality of notches for fitting around the first and second rails and a console bracket wherein the console is mounted to the bracket using the console bracket.

36. An overhead system for use in a vehicle, comprising:
a bracket mounted on at least two rails of a vehicle rail assembly, wherein the at least two rails are positioned on a headliner of the vehicle and a portion of the bracket sits below the top surfaces of the at least two rails; and
a console mounted to the bracket, wherein:
the console Includes a front-side portion, a back-side portion, a left side portion and a right-side portion; and
a plurality of notches are positioned on the front-side and back-side portions for fitting around the at least two rails.

* * * * *